United States Patent [19]

Retallick

[11] 4,445,570

[45] May 1, 1984

[54] HIGH PRESSURE COMBUSTOR HAVING A CATALYTIC AIR PREHEATER

[76] Inventor: William B. Retallick, 1432 Johnny's Way, West Chester, Pa. 19380

[21] Appl. No.: 352,216

[22] Filed: Feb. 25, 1982

[51] Int. Cl.³ .................. E21B 36/02; E21B 43/24
[52] U.S. Cl. ..................... 166/59; 60/723; 60/760; 166/303; 431/211
[58] Field of Search ................... 166/57–59, 166/302, 303; 431/4, 210, 211, 212, 242, 243, 353; 60/39.55, 723, 746, 760

[56] References Cited

U.S. PATENT DOCUMENTS

| | | | |
|---|---|---|---|
| 2,621,477 | 12/1952 | Powter et al. | 60/746 X |
| 2,707,029 | 4/1955 | Hartesveldt | 166/59 |
| 3,223,081 | 12/1965 | Hunt | 166/58 X |
| 3,804,163 | 4/1974 | Bradley et al. | 166/59 |
| 3,826,080 | 7/1974 | De Corso et al. | 60/39.55 |
| 3,971,847 | 7/1976 | Houseman | 431/210 |
| 4,019,316 | 4/1977 | Pfefferle | 60/723 X |
| 4,047,877 | 9/1977 | Flanagan | 60/746 |
| 4,197,700 | 4/1980 | Jahnig | 60/723 X |
| 4,199,024 | 4/1980 | Rose et al. | 166/59 |
| 4,237,973 | 12/1980 | Todd | 166/59 |
| 4,265,615 | 5/1981 | Lohmann | 431/353 |
| 4,377,205 | 3/1983 | Retallick | 166/59 |

FOREIGN PATENT DOCUMENTS

| | | | |
|---|---|---|---|
| 708017 | 4/1965 | Canada | 166/59 |
| 1070127 | 1/1980 | Canada | 60/723 |

*Primary Examiner*—George A. Suchfield
*Attorney, Agent, or Firm*—William H. Eilberg

[57] ABSTRACT

A combustor for generating a mixture of steam and combustion gas is located downhole in an oil well, so that the mixture can be injected directly into the reservoir, to displace heavy oil from the reservoir. The combustion is built up in stages, with each stage supplying hot air to the following stage. The first stage comprises a catalytic heat exchanger, which preheats the incoming air. One side of the exchanger is coated with catalyst. On this side of the exchanger the preheated air burns a clean fuel, so that heat flows through the metal wall of the exchanger to preheat the incoming air. The heated air from the first stage is used to ignite and burn a heavy fuel such as crude oil, which is burned in the second stage and following stages.

6 Claims, 5 Drawing Figures

HIGH PRESSURE COMBUSTOR HAVING A CATALYTIC AIR PREHEATER

BACKGROUND OF THE INVENTION

This invention relates to high pressure combustors for generating a mixture of steam and combustion gas downhole in an oil well. The mixture is injected into the surrounding oil reservoir to displace heavy oil from the reservoir.

The energy consumption in this process is great. It takes the energy equivalent of one barrel of oil to displace three barrels of oil from the reservoir. There is an incentive to burn the cheapest fuel available, which is usually the heavy crude oil produced from the same reservoir. Heavy oils will not light off and burn without substantial heat. It is simpler to heat air rather than oil, because the weight of air is 14-15 times the weight of oil. Also, heavy oil is not suitable for use in a catalytic heat exchanger, which is part of the present invention, because heavy oil would foul the surface of the heat exchanger. This invention discloses a means for providing heated air for burning heavy oil in the later stages of a multi-stage combustor.

SUMMARY OF THE INVENTION

In this combustor the combustion is built up in stages, with each stage supplying heated air to the following stage. The first stage comprises a catalytic heat exchanger, for preheating incoming air. One side of the exchanger is coated with catalyst. On this side of the exchanger the preheated air burns a clean fuel, such as natural gas or distillate oil, so that heat flows through the metal wall of the exchanger and preheats the incoming air. The heated air leaving the first stage is used to ignite and burn a heavy fuel such as crude oil, which is burned in the second stage and following stages. Thus, the relatively expensive "clean" fuel is used only in the first (catalytic) stage, and the second and following stages can be fueled with cheaper heavy crude oil.

It is an object of the invention to provide a combustor for generating a mixture of steam and combustion gas downhole so that the mixture can be injected directly into the oil reservoir.

It is another object to provide a combustor wherein the combustion is built up in stages so that each stage provides heated air for the following stage.

It is another object to provide a stage combustor wherein the first stage is a catalytic heat exchanger for preheating the incoming air.

It is another object to provide a stage combustor wherein heavy crude oil can be burned in the second stage and following stages.

It is another object to provide a staged combustor wherein only the first stage requires relatively expensive fuel.

Other objects and advantages of the invention will be apparent to persons skilled in the art, from a reading of the following brief description of the drawings, the detailed description of the invention, and the appended claims.

DETAILED DESCRIPTION OF THE INVENTION

Figure 5:
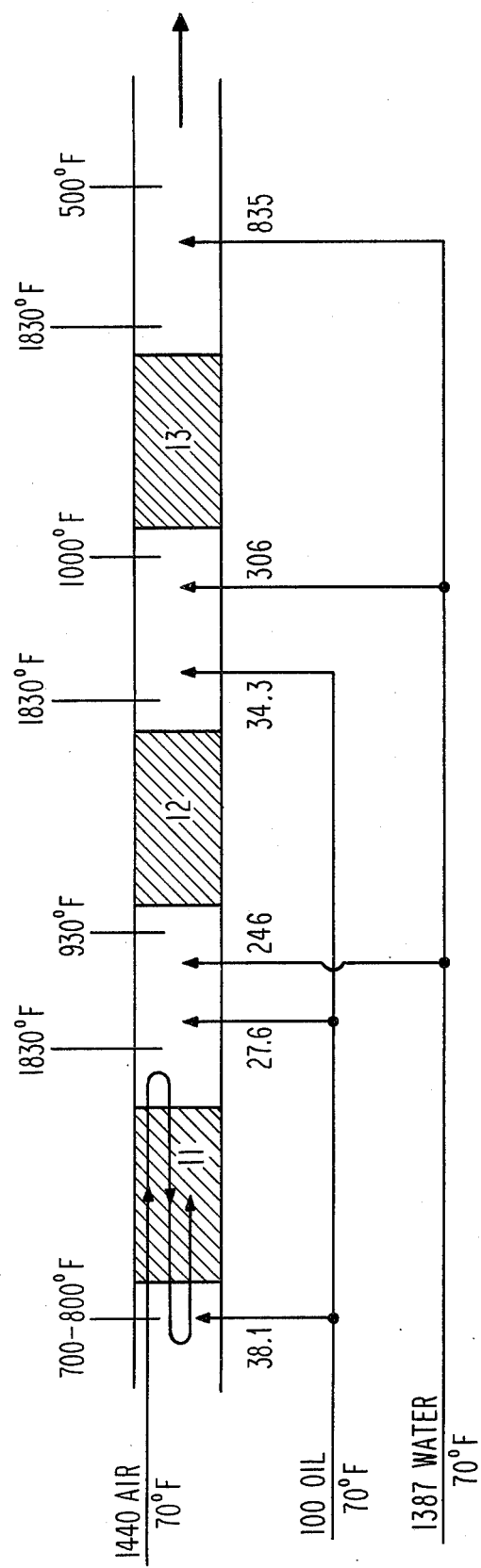
FIG. 5 is a schematic flow diagram of one embodiment of the invention, showing three stages of combustion.

FIG. 5 is a schematic diagram which illustrates the basic operation of the invention. The three stages of combustion are designated by reference numerals 11, 12 and 13. The structure of first stage 11 is described in detail later in this section. Stages 12 and 13 may be merely an open pipe, or may have more complex structures. As indicated, air, oil and water each at 70° F., are fed to the combustor. The designation of 70° F. is meant to indicate ambient temperature, and is not to be deemed critical. The numbers at the left-hand side of the figure (1440, 100 and 1387) indicate relative amounts by weight. Thus, for 100 pounds of fuel oil, having a net heating value of 18,500 BTUs per pound, one needs 1440 pounds of air to burn all the oil to yield a combustion gas that contains essentially no oxygen. The 1387 pounds of water is just enough to give a final mixture of combustion gas and steam at 500° F. which is suitable for injecting into the oil reservoir. The relative amounts of fuel and air are calculated from heat and mass balances. It is understood, however, that the numbers shown in the figure are for illustrative purposes only, and that the invention can be operated with other ratios, as will be explained below.

For this calculation, the fuel was assumed to be oil, and the same oil was fed to all three stages. The preferred fuel for stages 12 and 13 is crude oil or topped crude. Crude oil should not be fed to stage 11 because it would foul the catalyst. The fuel to stage 11 must be a clean distillate oil or a gas such as methane or natural gas. This substitution will change the flow rates slightly, but not the temperatures.

In the embodiment shown in FIG. 5, air is supplied only to the first combustion stage 11. As illustrated, the air is directed through this combustion stage three times, the air being forced to go back and forth, as shown. It is on the third pass through stage 11 that combustion occurs. The combustion stage 11 is so designed that the combustion therein pre-heats the air which is making a first or second pass through this stage of the combustor. Structural details of the combustor will be given below.

FIG. 5 indicates the temperatures at the input and output ends of each stage of the combustor. These temperatures are the temperatures that will be obtained under the operating conditions given in FIG. 5. However, other sets of temperatures are satisfactory, subject to the requirement that the temperature never become so low as to quench the combustion.

The numbers below each combustion stage in FIG. 5 indicate the relative amounts of oil and water that are fed to each stage. Thus, the 100 pounds of oil is divided as 38.1 pounds to the first stage, 27.6 pounds to the second stage, and 34.3 pounds to the third stage. There are 246 pounds of water fed between the first and second stages, 306 pounds between the second and third stages, and 835 pounds after the third stage.

The temperature leaving each stage is shown as 1830° F., which is high enough to insure complete combustion. The temperatures at the input ends of each stage must be high enough to insure that the fuel will ignite and burn. Also, the temperature entering successive stages should increase (note that FIG. 5 shows the input temperatures for stages 11, 12 and 13 to be 700°–800° F., and 1000° F., an increase from one stage to the next). This increase in temperature is to compensate for the lower concentration of oxygen after each combustion stage.

Figure 1:
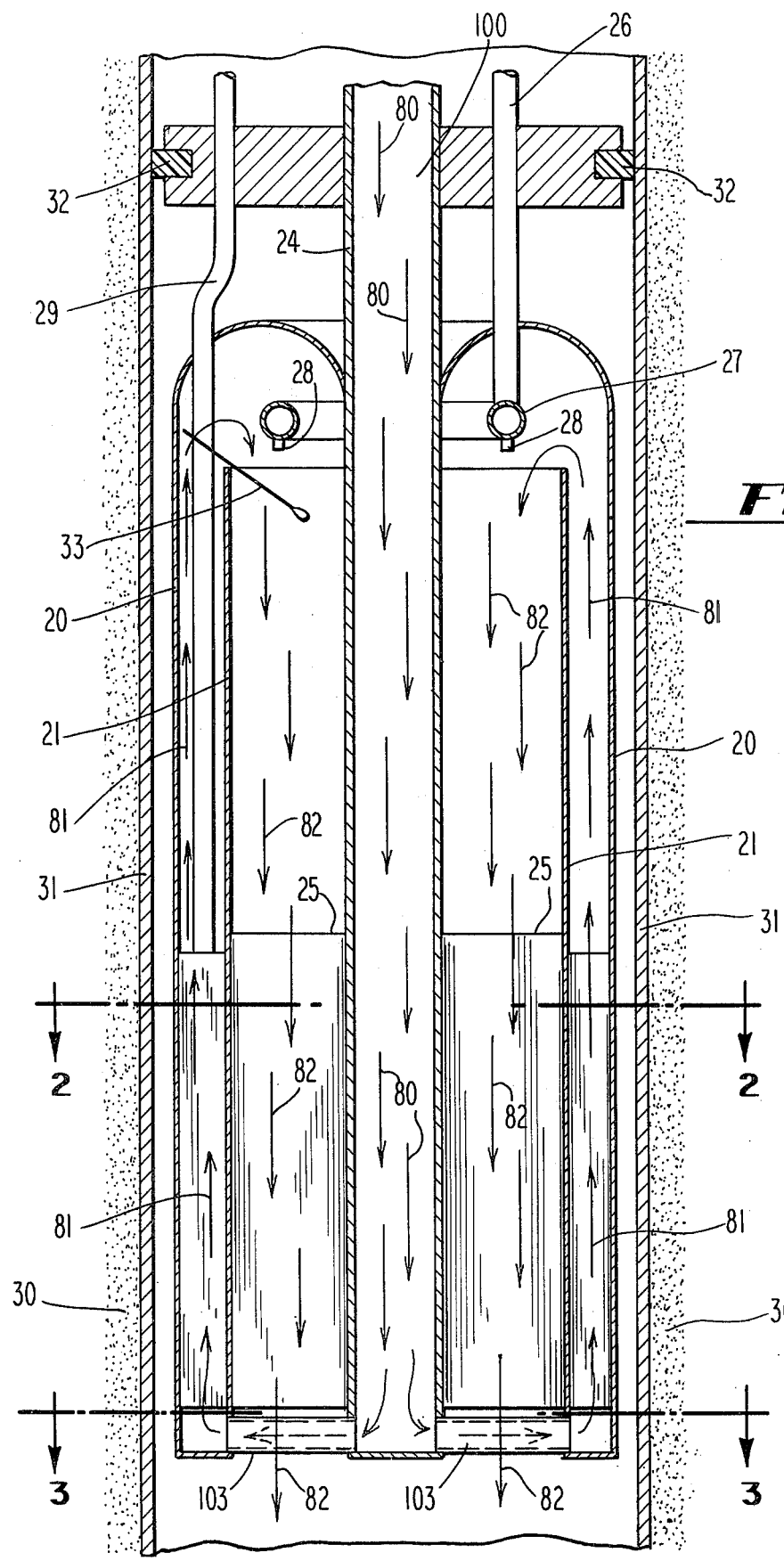
FIG. 1 is a vertical cross-section of the first stage of the combustor, showing the flow path of air through the catalytic heat exchanger.

FIG. 1 is a vertical section through the inlet to the preheating stage, which shows, in more detail, a possible design for first stage 11. Air enters through duct 100, defined by duct wall 24, in the direction of arrow 80, and returns through the annular space between walls 20 and 21, as indicated by arrows 81. The preheated air then flows through the annular space between duct wall 24 and wall 21 as indicated by arrows 82. Fuel enters through duct 26, donut ring 27, and nozzles 28, and mixes with the preheated air. Reference numeral 25 designates the upper extremity of a set of involute fins, to be described below, and the space between nozzles 28 and the upper extremity of fins 25 is for mixing the fuel and the air. Duct 29 is one of several that carries fuel or water to the successive combustion stages.

The mixture of combustion gas and steam that emerges from the combustor (along the path of arrows 82) is forced into the sand formation 30 of the oil reservoir. The oil well casing 31 is cemented into the formation in a conventional manner, and a pressure seal between the casing and the combustor is formed by packing 32.

Figure 2:
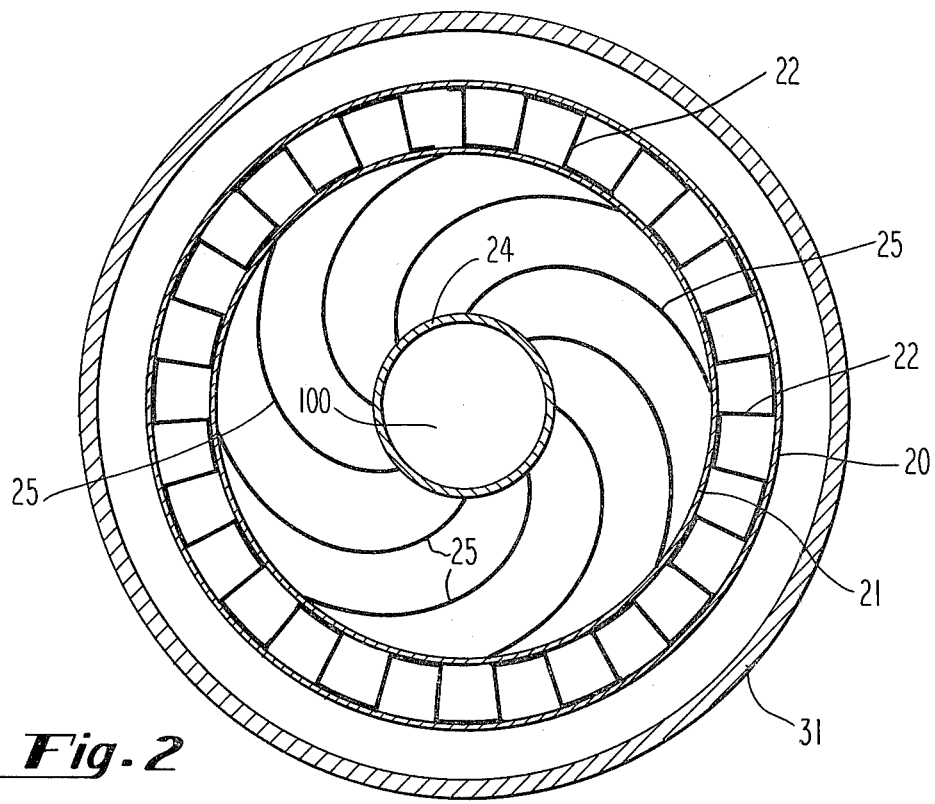
FIG. 2 is a cross-sectional view taken along the line 2—2 of FIG. 1.

FIG. 2 is a section across the bore of the catalytic heat exchanger in first stage 11. The exchanger has a double wall, 20 and 21, separated by a corrugated fin 22, to increase the heat transfer to air flowing between walls 20 and 21. The corrugated fin 22 oscillates between the walls 20 and 21 of the annulus. There is shown central duct wall 24. Air flows through duct 100 (as indicated by arrows 80 in FIG. 1) and returns through the annular space between walls 20 and 21. Curved fins 25 extend from wall 21 to duct wall 24. The curve of the fins is the involute of a circle. Adjacent fins are equidistant over their entire arc, which is the reason for using the involute. Thus, the annulus between wall 21 and duct wall 24 is filled with a uniform density of surface for heat transfer and combustion. The inside of wall 21, the outside of duct wall 24, and all of the surface of fins 25 are coated with catalyst. The inside of duct wall 24 is bare, i.e. devoid of catalyst. Heat generated on the surface of a fin 25 is conducted along the arc of the fin to wall 21 or to duct wall 24.

Some of the channels formed by corrugated fin 22 can serve as ducts for the fuel and the water going to the successive stages of combustion.

Figure 3:
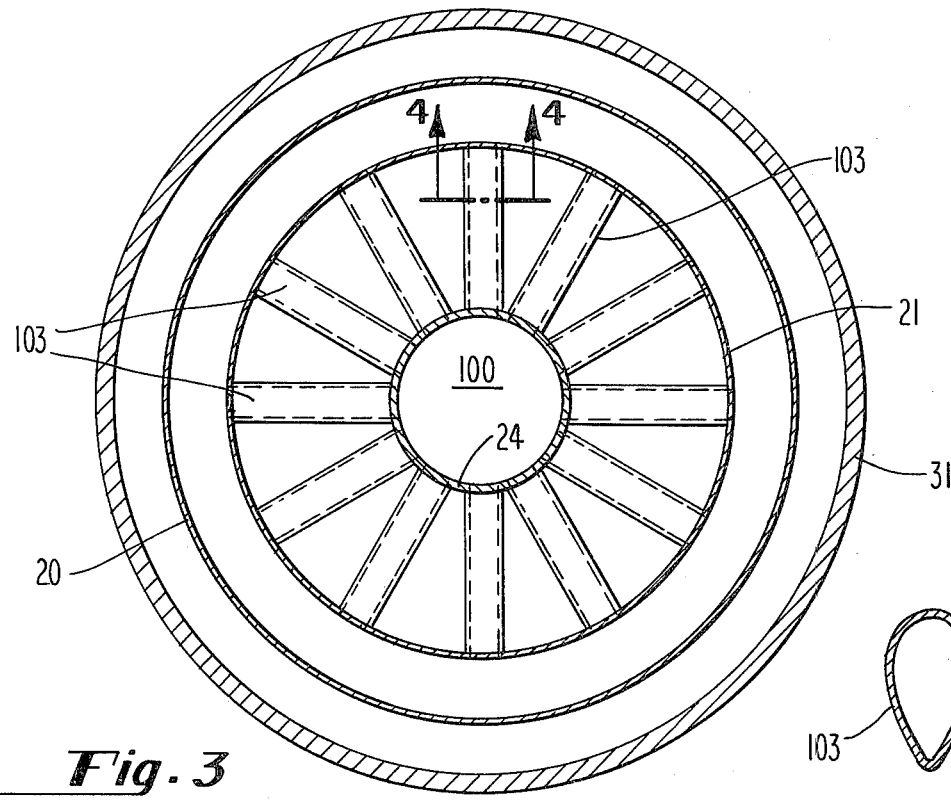
FIG. 3 is a cross-sectional view taken along the line 3—3 of FIG. 1.

FIG. 3, a cross-sectional view taken along the line 3—3 of FIG. 1, illustrates the structure of the first combustion stage, near its output end. Well casing 31 is shown, as well as walls 20 and 21, together with duct 100 defined by duct wall 24. The figure also illustrates a plurality of hollow spokes 103 which connect duct 100 with the space between walls 20 and 21. As is also shown in FIG. 1, spokes 103 provide a path for air to flow out of duct 100 and back through the space between walls 20 and 21.

Figure 4:
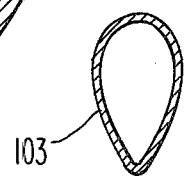
FIG. 4 is a cross-sectional view taken along the line 4—4 of FIG. 3.

Spokes 103 are, in this embodiment, of a streamlined cross-section, as illustrated in FIG. 4, taken along the line 4—4 of FIG. 3.

The fuel-air mixture in the first combustion stage can be ignited by glow plug 33. Alternatively, the combustion can be started by preceding the gaseous or oil fuel with a hypergolic fuel that ignites spontaneously upon contact with air. Either way, the first combustion can be a flame that anchors itself to the donut ring 27. The flame is allowed to burn long enough to heat the catalytic surface sufficiently for it to sustain catalytic combustion. Then the flow of fuel is momentarily cut off to extinguish the flame. Next the flow of fuel is resumed, though of course now there is no flame, and the combustion proceeds on the catalytic surface of the air preheater in first stage 11.

When the feed to the first stage has been set at 38.1 pounds of oil and 1440 pounds of air, as shown in FIG. 5, the temperature leaving the first stage will level out at 1830° F., and the temperature leaving the third stage 13 would reach 1830° F., even though combustion in the last two stages has not yet started. The injection of water after the third stage is started, to quench the final temperature to 500° F. Next, oil and water are injected ahead of second stage 12, gradually increasing to the rates shown in FIG. 1. Simultaneously, the amount of water injected after third stage 13 is increased to hold the final temperature at 500° F. The third stage 13 is brought on stream in the same way. Now all of the temperatures and flow rates are as shown in FIG. 1.

It is understood that one can "set" the feed to a given stage to be a specified amount of fuel, water etc., either by actually measuring the flow, or by an indirect means. A practical indirect means is to monitor the temperature at both the input and output side of a combustion stage, and to vary the flow rates of fuel and water (or, in the case of the first stage, fuel and air) until the desired temperatures are achieved. When the desired input and output temperatures are observed, one can infer that the flow rates are correct.

In FIG. 5, the final temperature of 500° F. is fixed by the two ratios, air/oil and water/oil. All other temperatures can be varied without changing these ratios. To raise the temperature from the first stage, one would burn more of the oil in the first stage. To raise the temperatures from the second and third stages, one would inject less water ahead of these stages, and inject the extra water after the third stage.

The temperature entering the second stage, in the embodiment shown in FIG. 5, is calculated by heat balance, from mixing 27.6 pounds of oil and 246 pounds of water, both at 70° F., with 1478 pounds of combustion gas from the first stage. This calculated 930° F. is the temperature that would exist if mixing were completed before any of the 27.6 pounds of oil were burned. It is the lowest temperature that can exist. The actual temperature will likely be higher because some burning takes place simultaneously with mixing. The temperature must be kept high enough to insure that there is no possibility of extinguishing the combustion. This is the criterion which is most important in designing combustors having different numbers of stages. If the feeds to the second and third stages were combined and fed to a single combined stage, the calculated minimum temperature entering that combined stage would be only about 100° F. If burning did not proceed simultaneously with mixing, the combustion would certainly be extinguished. But if the combined feeds to the second and third stages were divided among more than two stages, the calculated minimum temperatures entering these stages would be higher than the temperatures in FIG. 5, but the outlet temperatures would remain at 1830° F.

There are some simple combustors that comprise only the first stage in FIG. 5. For example, one can burn 38.1 pounds of air with 1440 pounds of air, and quench the combustion gas with 457 pounds of water. The resulting mixture is at 500° F., which is right for injecting into the oil reservoir. The mixture contains about 12% oxygen, however. In the preferred embodiment, the mixture for injection contains no oxygen, which is why the additional stages were included in FIG. 5.

In a second example, one can substitute 34.5 pounds of methane gas for the 38.1 pounds of oil. The temperature from the first stage remains at 1830° F., and the other temperatures and flow rates are almost unchanged. This amount of methane constitutes 4.2 mol% in the methane-air mixture, which is below the flammability limit of 5.3%. (The flammability limit is that mol% of methane, or other combustible gas, below which a flame will not travel through the mixture.) Thus, the air and methane could be mixed at ground level and piped downhole through a single pipe. The problem of mixing air and fuel ahead of the first stage is eliminated. There is no lower limit to the concentration of combustible that can be burned over a catalyst, and this is the essence of this example.

In a third example, one can burn a mixture that contains, say, 4.2% methane and 8.4% oxygen, the remainder being noncombustible gases such as nitrogen or carbon dioxide. What is important is that the methane content is below the flammability limit, and that the oxygen content is just sufficient to burn the methane completely, so there is no oxygen in the combustion gas. One analogous mixture would contain 2.0% propane and 10.0% oxygen. The gases are mixed at ground level and piped downhole through a single pipe. The problem of mixing air and fuel downhole is eliminated completely. The oxygen free combustion gas is quenched with water and injected into the oil reservoir.

In FIG. 5, the oil and water are injected into stages 12 and 13 in separate streams. The oil and water can as well be combined into an emulsion and fed as a single stream. Also in FIG. 5, all of the air is fed to the first stage. It is quite possible to bypass some of the air to the later stages of combustion.

As stated above, the number of stages of combustion can be varied, as long as operating conditions are chosen so as not to quench the combustion. Other design details are variable, such as the number of passes made by the air through the first stage. These and other modifications are to be deemed within the spirit and scope of the following claims.

What is claimed is:

1. A catalytic combustor for generating a mixture of steam and combustion gas downhole in an oil well, comprising:
   (a) a nest of three coaxial metal pipes that define inner and outer annular passages,
   (b) the wall in the inner annulus being coated with catalyst,
   (c) means for directing incoming air first through the central pipe, then through the outer annulus in the opposite direction, and then through the inner annulus in the first direction, and
   (d) means for mixing fuel with the air after it has traversed the outer annulus and before it has traversed the inner annulus.

2. The combustor of claim 1, wherein the inner annulus contains a nest of fins having the shape of the involute of a circle, the fins being attached to both walls of the annulus, the fins being coated with catalyst.

3. The combustor of claim 2 wherein the outer annulus is traversed by a corrugated fin that oscillates between the walls of the annulus.

4. A catalytic combustor for generating a mixture of steam and combustion gas downhole in an oil well, comprising:
   (a) a nest of three coaxial metal pipes that define inner and outer annular passages,
   (b) the walls of the inner annulus being coated with catalyst,
   (c) means for directing a mixture of gaseous fuel and oxidizing gas first through the central pipe, then through the outer annulus in the opposite direction, and then through the inner annulus in the first direction.

5. The combustor of claim 4 wherein the inner annulus contains a nest of fins having the shape of the involute of a circle, the fins being attached to both walls of the annulus, the fins being coated with catalyst.

6. The combustor of claim 5, wherein the outer annulus is traversed by a corrugated fin that oscillates between the walls of the annulus.

* * * * *